April 22, 1969     G. B. LYNCH     3,439,976
SYMMETRICAL COPYING LENS OF THE INVERSE GAUSS TYPE
Filed Oct. 23, 1965
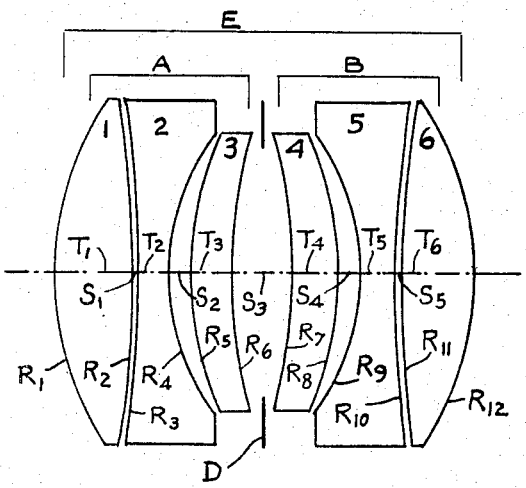

United States Patent Office 3,439,976
Patented Apr. 22, 1969

3,439,976
SYMMETRICAL COPYING LENS OF THE INVERSE GAUSS TYPE
Geraldine B. Lynch, Irondequoit, N.Y., assignor to Minnesota Mining and Manufacturing Company, St. Paul, Minn., a corporation of Delaware
Filed Oct. 23, 1965, Ser. No. 503,947
Int. Cl. G02b 9/62
U.S. Cl. 350—215         1 Claim

ABSTRACT OF THE DISCLOSURE

A six element symmetrical lens of the inverse Gauss type, in which all elements are air spaced from each other, the first and last elements being biconvex, elements 2 and 5 being biconcave, and elements 3 and 4 being positive meniscus lenses. The adjacent surfaces of elements 1 and 2 and of elements 5 and 6 are of the same radius, but these elements are very slightly spaced from each other rather than being cemented.

---

The present invention relates to lenses suitable for photographic copying, and more particularly to a symmetrical lens which is of the inverse Gauss type.

An object of the invention is the provision of a generally improved and more satisfactory lens suitable for photographic copying.

Another object is the provision of an improved symmetrical lens of the inverse Gauss type.

Still another object is the provision of a lens of this type which has high image quality, especially when functioning at unit magnification, although not limited in its usefulness to this magnification.

A further object is the provision of a lens of the inverse Gauss type which has a relative aperture of $f/4.5$, and which when used in the plane of best definition is well corrected for chromatic and monochromatic aberrations as well as for field curvature and astigmatism over a total field angle of 56°.

A still further object is the provision of such a lens so designed that there is high image quality and no loss of illumination due to vignetting over a total field angle of 56° when used at an aperture of $f/5.6$.

Yet another object is the provision of a lens which is essentially free of distortion, so that it is suitable for use in photographic copying.

These and other desirable objects may be attained in the manner disclosed as an illustrative embodiment of the invention in the following description and in the accompanying drawing forming a part hereof, in which the single figure is a diagram of a lens according to a preferred embodiment of the invention.

The lens of the present invention is truly symmetrical, which not only minimizes the cost of tooling necessary for manufacture and minimizes the inventory of parts, but moreover serves to correct the three transverse aberrations of distortion, coma, and lateral color.

Referring to the diagram, the lens system as a whole is designated by the letter E, and it will be seen that it is of a symmetrical inverse Gauss type of construction. It is symmetrical about its axial center. The individual lens elements are numbered from 1 to 6, consecutively from front to rear, although it will be realized that since the lens is truly symmetrical, it does not matter which is the front and which is the rear. Thus element 1 is identical with element 6, but faced in the opposite direction, and element 2 is identical with element 5, but faced in the opposite direction, and element 3 is identical with element 4, likewise faced in the opposite direction. The diaphragm or stop, diagrammatically indicated at D, is in the center of the lens assembly, midway between the elements 3 and 4.

The elements 1, 2, and 3 are collectively designated by the letter A, and the elements 4, 5, and 6 are collectively indicated by the letter B.

The radii of curvature R of the lens surfaces, the axial thicknesses T of the lens elements, and the axial air spacings S are all expressed in the customary manner, with the usual subscript numerals indicating the particular surface, lens thickness, or air space, numbered in sequence from front to rear. Positive and negative values of R indicate surfaces respectively convex and concave toward the front. But since the lens is truly symmetrical, it does not matter which way it is faced, and either end of the assembly may be at the front. The respective refractive indices, expressed with reference to the spectral D line of sodium, are indicated by N, and the dispersive indices or Abbe numbers are indicated by V, with subscripts when necessary to identify the particular lens element. The equivalent focal length of the entire objective or lens assembly, is designated as $F_E$, and the equivalent focal length of the front half A (that is, elements 1, 2, and 3 taken collectively) is designated as $F_A$, and the equivalent focal length of the rear half (elements 4, 5, and 6 collectively) is designated as $F_B$. It is, of course, equal to $F_A$. The focal length of any individual lens element is indicated by F with a numerical subscript identifying the individual lens element.

According to the present invention, best results are attained when $F_A = F_B$ = approximately $1.62 F_E$, and when the vertex to vertex overall length of the lens system = approximately $0.3 F_E$. Also, according to the present invention, good results are attained when the variable factors indicated in accompanying Table 1 are within the respective ranges or limits there indicated.

TABLE 1

$.713 \, F_1 < +R_1 = -R_{12} < .788 \, F_1$
$2.827 \, F_1 < -R_2 = +R_{11} < 3.125 \, F_1$
$-3.350 \, F_2 < -R_3 = +R_{10} < -3.703 \, F_2$
$-.625 \, F_2 < +R_4 = -R_9 < -.691 \, F_2$
$.194 \, F_3 < +R_5 = -R_8 < .215 \, F_3$
$.304 \, F_3 < +R_6 = -R_7 < .336 \, F_3$
$.058 \, F_E < T_1 = T_6 < .061 \, F_E$
$.024 \, F_E < T_2 = T_5 < .027 \, F_E$
$.031 \, F_E < T_3 = T_4 < .040 \, F_E$
$.0001 \, F_E < S_1 = S_5 < .004 \, F_E$
$.014 \, F_E < S_2 = S_4 < .016 \, F_E$

TABLE 1—Cont.

$$.037\ F_E < S_3 < .047\ F_E$$
$$.303\ F_E < +F_1 = +F_6 < .334\ F_E$$
$$.255\ F_E < -F_2 = -F_5 < .282\ F_E$$
$$1.208\ F_E < +F_3 = F_4 < 1.335\ F_E$$
$$.187\ F_A < +F_1 = +F_6 < .207\ F_A$$
$$.158\ F_A < -F_2 = -F_5 < .175\ F_A$$
$$.747\ F_A < +F_3 = +F_4 < .826\ F_A$$

A specific example of a lens whose variables fall within the limits of Table 1, and which meets all of the outlined requirements and gives excellent results, may be constructed in accordance with the numerical data in Table 2, the various symbols therein having the same meanings above explained.

TABLE 2

| Lens | $N_D$ | V | Radii | Thicknesses | Focal length |
|---|---|---|---|---|---|
| 1 | 1.6110 | 57.2 | $R_1=+23.893$ | $T_1=6.02$ | $F_1=+31.843$ |
|   |        |      | $R_2=-94.764$ | $S_1=0.048$ |               |
| 2 | 1.5497 | 45.8 | $R_3=-94.764$ | $T_2=2.60$ | $F_2=-26.873$ |
|   |        |      | $R_4=+17.67$  | $S_2=1.47$ |               |
| 3 | 1.5230 | 50.5 | $R_5=+26.007$ | $T_3=3.54$ | $F_3=+127.131$ |
|   |        |      | $R_6=+40.717$ | $S_3=4.22$ |               |
| 4 | 1.5230 | 50.5 | $R_7=-40.717$ | $T_4=3.54$ | $F_4=+127.131$ |
|   |        |      | $R_8=-26.007$ | $S_4=1.47$ |               |
| 5 | 1.5497 | 45.8 | $R_9=-17.67$  | $T_5=2.60$ | $F_5=-26.873$ |
|   |        |      | $R_{10}=+94.764$ | $S_5=0.048$ |            |
| 6 | 1.6110 | 57.2 | $R_{11}=+94.764$ | $T_6=6.02$ | $F_6=+31.843$ |
|   |        |      | $R_{12}=-23.893$ |          |               |

Equivalent focal length of system = $F_E$ = 100.0.
Aperture = f/4.5    Field angle = 56°.

In the foregoing Table 2, all of the linear dimensions are relative rather than absolute, and are based on an equivalent focal length of 100. This is in accordance with a common form of notation frequently used and well understood in the art.

It is pointed out that in most lenses of this same general type, elements similar to the present elements 1 and 2 are cemented together, and the same is true of elements similar to the present elements 5 and 6. As distinguished from the prior construction, the present invention employs an air gap between elements 1 and 2 and between elements 5 and 6. This is a relatively small air space, but by introducing this air space between the elements which are normally cemented in the typical prior art, it is possible to control the astigmatism and field curvature over the rather large field angle of 56°. Because of this air gap, and because of the careful choice of the other variables within limits indicated in Table 1, and preferably with the values indicated in Table 2, a particularly satisfactory lens is produced, having a larger aperture for the lateral ray bundles than is similar lenses of the prior art, giving a significant improvement for photographic purposes since it helps to offset the effects of limited or unsatisfactory lighting conditions.

Among the variations which are possible without departing from the invention, it is possible to vary the above mentioned small air space $S_1$ and its symmetrical counterpart $S_5$, to effect a change in the tangential and sagittal fields at a ratio in excess of 5 to 1. Field curvature may be adjusted by varying $S_2$, $S_3$, or $S_4$, without seriously affecting any other lens aberrations. A slight "bending" of elements 1 and 6 will also cause a change in field curvature. The meaning of the term "bending" as applied to a lens element is well understood in the art. Negative spherical aberrations can be introduced by several methods, such as by a slight redistribution of power between $R_1$ and $R_4$ (and simultaneously between their symmetrical counterparts $R_{12}$ and $R_9$) while maintaining $F_E$ constant, or by increasing $T_1$ and $T_6$, or by increasing $T_2$ and $T_5$. However, caution should be exercised so as not to upset the field curvature correction.

It will be observed that the lens system or objective as a whole has six lens elements all air spaced from each other and divided into a front group A and a rear group B, the two groups being identical with each other but oppositely faced. In each group, the middle element (element 2 or 5) is a biconcave negative lens axially alined with and located between two convergent positve elements (1 and 3, or 4 and 6). The outer positive element (1 or 6) is a biconvex element having a stronger or shorter radius curve on its outer surface (i.e., the surface away from the adjacent negative element) and a weaker or longer radius curve on its other surface, faced toward the adjacent negative element. The other positive element (3 or 4) is a meniscus lens with its concave face toward the center of the system, i.e., faced toward the diaphragm or stop D.

It is seen from the foregoing disclosure that the objectives and purposes of the invention are well fulfilled. It is to be understood that the foregoing disclosure is given by way of illustrative example only, rather than by way of limitation, and that without departing from the invention, the details may be varied within the scope of the appended claim.

What is claimed is:

1. A symmetrical lens system comprising six lens elements all air spaced from each other and axially alined with each other, elements 1 and 6, when numbered consecutively from front to rear, being biconvex positive lenses, elements 2 and 5 being biconcave negative lenses, elements 3 and 4 being positive meniscus lenses with their respective concave faces toward each other, the below mentioned characteristics of the elements and their spatial relationship to each other being substantially in the proportions indicated by the data in the following table:

| Lens | $N_D$ | V | Radii | Thicknesses |
|---|---|---|---|---|
| 1 | 1.6110 | 57.2 | $R_1=+23.893$ | $T_1=6.02$ |
|   |        |      | $R_2=-94.764$ | $S_1=0.048$ |
| 2 | 1.5497 | 45.8 | $R_3=-94.764$ | $T_2=2.60$ |
|   |        |      | $R_4=+17.67$ | $S_2=1.47$ |
| 3 | 1.5230 | 50.5 | $R_5=+26.007$ | $T_3=3.54$ |
|   |        |      | $R_6=+40.717$ | $S_3=4.22$ |
| 4 | 1.5230 | 50.5 | $R_7=-40.717$ | $T_4=3.54$ |
|   |        |      | $R_8=-26.007$ | $S_4=1.47$ |
| 5 | 1.5497 | 45.8 | $R_9=-17.67$ | $T_5=2.60$ |
|   |        |      | $R_{10}=+94.764$ | $S_5=0.048$ |
| 6 | 1.6110 | 57.2 | $R_{11}=+94.764$ | $T_6=6.02$ |
|   |        |      | $R_{12}=-23.893$ |          | wherein the lens elements are numbered from front to rear in the first column, the corresponding refractive indices N for the D line of sodium are given in the second column, the corresponding Abbe dispersive indices are given in the third column, the radii of curvature R of the responsive lens surfaces are given in the fourth column, the respective surfaces being numbered from front to rear and being respectively identified by the subscript numeral used with each R, plus and minus values of R indicating curved surfaces which are respectively convex and concave toward the front of the lens system, the respective axial thicknesses T of the lens elements and axial spaces S between successive elements being given in the fifth column, spaces being consecutively numbered from front to rear, the linear dimensions of radii, thicknesses, and spaces being expressed proportionally on the basis of a lens system having an equivalent focal length of 100.

References Cited

UNITED STATES PATENTS 3,185,031  5/1965  Betensky et al. _____ 350—215

DAVID SCHONBERG, *Primary Examiner.*

R. J. STERN, *Assistant Examiner.*

U.S. Cl. X.R.

350—210